US010562816B2

(12) United States Patent
Yin et al.

(10) Patent No.: US 10,562,816 B2
(45) Date of Patent: Feb. 18, 2020

(54) NON-CALCINED CEMENTITIOUS COMPOSITIONS, NON-CALCINED CONCRETE COMPOSITIONS, NON-CALCINED CONCRETE AND PREPARATION METHODS THEREOF

(71) Applicant: RUENTEX MATERIALS CO., LTD., Taipei (TW)

(72) Inventors: Samuel Yin, Taipei (TW); Ching Ting Yang, Taipei (TW); Min-Tsung Wu, Taipei (TW); Chen-An Lee, Taipei (TW); Hui Sheng Chiu, Taipei (TW)

(73) Assignee: RUENTEX MATERIALS CO., LTD., Taipei (TW)

( * ) Notice: Subject to any disclaimer, the term of this patent is extended or adjusted under 35 U.S.C. 154(b) by 224 days.

(21) Appl. No.: 15/637,265

(22) Filed: Jun. 29, 2017

(65) Prior Publication Data
US 2019/0002347 A1 Jan. 3, 2019

(51) Int. Cl.
*C04B 28/06* (2006.01)
*C04B 14/06* (2006.01)
*C04B 24/04* (2006.01)
*C04B 22/06* (2006.01)

(52) U.S. Cl.
CPC .............. *C04B 28/06* (2013.01); *C04B 14/06* (2013.01); *C04B 14/068* (2013.01); *C04B 22/064* (2013.01); *C04B 24/04* (2013.01)

(58) Field of Classification Search
CPC ..... C04B 14/06; C04B 14/068; C04B 22/064; C04B 24/04; C04B 28/06
See application file for complete search history.

(56) References Cited

U.S. PATENT DOCUMENTS

| 5,961,712 A | 10/1999 | Sun et al. |
| 8,562,734 B2 | 10/2013 | Yin et al. |
| 10,233,335 B2 * | 3/2019 | Soofi ......................... C09D 7/69 |
| 2005/0139119 A1 * | 6/2005 | Rader ....................... C09G 1/02 |
| | | 106/3 |

FOREIGN PATENT DOCUMENTS

| CN | 1223626 A | 7/1999 |
| CN | 103255888 A | 8/2013 |
| GB | 2372038 A | 8/2002 |
| TW | I491579 B | 7/2015 |
| WO | WO-2010006987 A1 | 1/2010 |
| WO | WO-2011008463 A1 | 1/2011 |
| WO | WO-2014035602 A1 | 3/2014 |

OTHER PUBLICATIONS

Combined Search and Examination Report for GB1710429.0 dated Dec. 14, 2017.
First Examination Report for DE10201700688.8 dated Dec. 18, 2017.
Taiwanese Office Action for TW10612833 dated Jan. 22, 2018.

* cited by examiner

*Primary Examiner* — Anthony J Green
(74) *Attorney, Agent, or Firm* — Drinker Biddle & Reath LLP

(57) ABSTRACT

The present invention provides non-calcined cementitious compositions comprising micron inorganic particles, which can be used as a binder material; and provides non-calcined concrete compositions; non-calcined concretes are also provided, which exhibit similar or better physical and mechanical properties than those prepared with traditional cements do. The present invention also provides the preparation methods of the non-calcined cementitious compositions, the non-calcined concrete compositions and the non-calcined concretes.

12 Claims, No Drawings

NON-CALCINED CEMENTITIOUS COMPOSITIONS, NON-CALCINED CONCRETE COMPOSITIONS, NON-CALCINED CONCRETE AND PREPARATION METHODS THEREOF

BACKGROUND OF THE INVENTION

1. Field of the Invention

The present invention provides a non-calcined cementitious composition comprising micron inorganic particles, which is useful as a binder material; a non-calcined concrete composition; and a non-calcined concrete, which exhibits physical and mechanical properties similar to or better than those prepared with traditional cements do. The present invention also provides methods for preparing the non-calcined cementitious composition, the non-calcined concrete composition and the non-calcined concrete.

2. Description of the Related Art

Cement is a generic term for binder materials commonly used in construction materials, and is one of the most important construction materials today. Statistical data from Portland Cement Association shows that global consumption of cement was about 4.1 billion tons in 2015, which evidences the importance of cements. The most commonly used cement is Portland cement, the main components of which are derived from limestone, clay, silica ore, iron slag and other materials. However, most of these materials are obtained by mining natural minerals, which imposes a heavy impact on the environment. In addition, due to the use of limestone and other raw materials, high-temperature calcination is needed in the preparation of cements, which consumes a great deal of energy and creates considerable carbon emissions. In addition, the evaluated remaining productive life of limestone minerals in China and Taiwan is only about 50 years or less. These issues, including shortage of construction materials, are potential problems in environmental protection.

Accordingly, attempts have been made to use alternative raw materials in the industry for the purpose of reducing consumption of natural resources and carbon emissions during the process of manufacturing cement. One limestone-free cementitious material is alkali-activated cement, which is prepared by the polymerization of a silicoaluminate (fly ash) with sodium silicate (water glass) in the presence of a strong alkali. However, it is associated with potential problems of excessive shrinkage, heat release during the blending process, cracking of the end products, production of salt crystals on the surface, and other issues. Also, the use of a large amount of strong alkali may easily lead to corrosion and rusting of the steel material, causing an adverse impact on the late strength of the structure. The use of a large amount of strong alkali limits its potential for large-scale application. In addition, some alkali-activated cement needs to be catalyzed at high temperature for several hours before it is hardened. Accordingly, there are still many limitations to the practical viability of alkali-activated cement.

TW 1491579 B (corresponding to U.S. Pat. No. 8,562,734 B2) discloses a low-calcium-cementitious material composition, in which low calcium fly ash, an alkali and a congealing agent are particularly used, mixed at room temperature, and stood to form a low-calcium-cementitious material. This invention is mainly characterized in the use of a congealing agent to solve the problem that a further calcium-containing component needs to be added when low-calcium fly ash is used as known in the art.

WO 2011/008463 A1 discloses the use of a cementitious composition comprising (1) at least one inorganic filler, (2) a colloidal silica, colloidal alumina or mixture thereof, which forms a binding phase upon being fired, and (3) a carrier fluid. However, the cementitious composition needs to be calcinated at high temperature (at least 1000° C.) in the presence of a fluorine source to form a binder phase.

Therefore, there is still a great need for a cementitious binder material that minimizes the impact on the environment during the manufacturing process and can be easily applied on large-scale application.

SUMMARY OF THE INVENTION

To achieve the above objects, the present invention provides a non-calcined cementitious composition, comprising:
(a) micron inorganic particles having a particle size ranging from 1.0 to 100 μm of about 31% to 87% based on the total weight of the composition;
(b) an aluminum-oxygen compound;
(c) nanocolloidal silica; and
(d) a coagulation controlling agent.

After the components in the composition are mixed, without calcination, the composition can serve as a binder material as the cement in the construction material does.

The present invention also provides a non-calcined concrete composition, comprising:
(a) inorganic particles of about 66% to 92% based on the total weight of the composition;
(b) an aluminum-oxygen compound;
(c) nanocolloidal silica; and
(d) a coagulation controlling agent,
where the inorganic particles comprise micron inorganic particles having a particle size ranging from 1.0 to 100 μm, and the micron inorganic particles account for 25% to 45% of the total weight of the inorganic particles. After the components in the composition are mixed, the composition exhibits, without calcination, mechanical properties similar to and volume stability better than those of a concrete prepared with a common cement.

The present invention also provides a non-calcined concrete comprising a non-calcined cementitious composition or non-calcined concrete composition.

The present invention also provides a method for preparing a non-calcined cementitious composition, comprising a step of combining micron inorganic particles, an aluminum-oxygen compound, nanocolloidal silica and a coagulation controlling agent.

The present invention also provides a method for preparing a non-calcined concrete composition, comprising a step of combining inorganic particles, an aluminum-oxygen compound, nanocolloidal silica, and a coagulation controlling agent.

SUMMARY OF THE INVENTION

All figures expressing the contents, proportions, physical characteristics and others used in this specification and in the claims are to be construed as being modified by the term "about" in all cases. Accordingly, unless otherwise indicated, the values set forth in the following description and in the appended claims may vary depending on the intended and/or desired characteristics of the present invention. Without limiting the application of the equivalence principle to the scope of the claims, the numerical parameters should be interpreted at least on the basis of the number of significant digits disclosed and by application of general rounding.

All ranges disclosed herein are to be construed as encompassing any and all sub-ranges embraced therein. For example, the range of 1 to 10 should be considered to include any and all sub-ranges between the minimum value 1 and the maximum value 10, inclusive; that is, all sub-ranges starting with a minimum value of 1 or greater and ending with a maximum value of 10 or less, for example, 1 to 6.7, 3.2 to 8.1 or 5.5 to 10; and encompassing any and all numerical values in the ranges, for example: 1, 3.1, 5.2 or 8.

The term "about" disclosed herein refers to an approximate range that is understood by those of ordinary skill in the art to which this invention pertains, and the approximate range correlates with different features or physical quantities. For example, the term "about" includes a range of ±10%, E 5%, ±2%, or ±1% of the stated value.

The composition provided in the present invention comprises (micron) inorganic particles, an aluminum-oxygen compound, nanocolloidal silica, and a coagulation controlling agent. The components are described in detail below.

A. Inorganic Particles

Inorganic particles contained in the composition of the present invention comprise inorganic particles containing at least one of silicon and aluminum, for example, a substance formed by at least one of silicon and aluminum with various metal or non-metallic elements. The metal elements may include, for example, alkali, alkali earth, metalloid and transition metal elements, and the non-metallic elements may include, for example, carbon, hydrogen, oxygen, nitrogen, boron, phosphorus, sulfur, halogen and the like. Examples include, but are not limited to, an oxide (for example, silicate and silica) and a carbide (for example, silicon carbide) of silicon; a variety of compounds formed by silicon, aluminum, and oxygen; or a combination of these compounds. Other inorganic ingredients may be optionally present, for example, various substances formed by the metal and/or non-metallic elements above, for example, various compounds containing calcium, magnesium, boron, carbon, nitrogen, and oxygen, or any combination of these compounds. For example, the inorganic particles may be derived from various natural ores or rocks, quartz sand, terrestrial sandstone, silica sand, river sand, sea sand, reservoir silt or any combination of the foregoing, and inevitable impurities contained therein. In a specific embodiment, the inorganic particles comprise quartz sand, gravel or both, and the quartz sand and gravel can be mixed at any ratio when both of them are present.

The non-calcined cementitious composition provided in the present invention comprises inorganic particles having a particle size ranging from 1.0 to 100 µm, which are referred to as micron inorganic particles herein. The micron inorganic particles are a main component in the non-calcined cementitious composition, and account for about 31% to 87%, preferably 42% to 81%, and more preferably 52% to 76% of the total weight of the non-calcined cementitious composition.

In the non-calcined concrete composition provided in the present invention, the inorganic particles are present in the largest content, which is about 66% to 92%, preferably 72% to 90%, and more preferably 74% to 86% of the total weight of the non-calcined cementitious composition.

In the non-calcined concrete composition provided in the present invention, the particle size of the inorganic particles is not particularly limited, and can be at a nanometer to millimeter scale, provided that at least a part of the inorganic particles are micron inorganic particles, and the micron inorganic particles account for 25% to 45%, preferably 27% to 43%, and more preferably 30% to 40% of the total weight of the inorganic particles.

In one embodiment of the present invention, the micron inorganic particles may have a particle size ranging from 1.0 to 1.3 µm, 1.3 to 1.6 µm, 1.6 to 2.6 µm, 2.6 to 6.5 µm, 6.5 to 8.0 µm, 8.0 µm to 10.0 µm, 10.0 to 13.0 µm, 13.0 to 28.0 µm, 28.0 to 38.0 µm, 38.0 to 45.0 µm, 45.0 to 50.0 µm, 50.0 to 53.0 µm, 53.0 to 58.0 µm, 58.0 to 75.0 µm, 75.0 to 86.0 µm, and 86.0 to 100.0 µm, or in any range constituted by any of the aforementioned endpoints as an upper and a lower limit thereof. Alternatively, the micron inorganic particles may have a particle size of any of the aforementioned endpoints, for example, about 1 µm, about 1.3 µm, about 1.6 µm . . . about 8.0 about 10.0 µm, about 13.0 µm . . . about 50.0 µm, about 58.0 µm, about 75.0 µm, about 86.0 µm, and about 100 µm.

In one embodiment of the present invention, the micron inorganic particles have a unimodal particle size distribution. In another embodiment, the particle size distribution is bimodal or multimodal, and the distribution pattern may be any combination of one or more sets of single particle sizes or one or more sets of particle size ranges. For example, in one embodiment, the micron inorganic particles may, for example, have a unimodal particle size distribution at 1 µm to 2.6 µm; a unimodal particle size distribution at about 1.3 µm; a unimodal particle size distribution at about 1.6 µm; a unimodal particle size distribution at 8.0 to 13.0 µm; a unimodal particle size distribution at about 8.0 µm; a unimodal particle size distribution at about 10.0 µm; a bimodal particle size distribution at 1 to 2.6 µm and 6.5 to 13.0 µm; a bimodal particle size distribution at about 1.0 µm and about 8.0 µm; a bimodal particle size distribution at about 1.6 µm and about 13.0 µm; a bimodal particle size distribution at 6.5 to 13.0 µm and 45.0 to 58.0 µm; a bimodal particle size distribution at 6.5 to 10.0 µm and 50.0 to 58.0 µm; a bimodal particle size distribution at 8.0 to 10.0 µm and 50.0 to 53.0 µm; a bimodal particle size distribution at about 10.0 µm and about 45.0 µm; a bimodal particle size distribution at about 6.5 µm and about 50.0 µm; a bimodal particle size distribution at about 10.0 µm and about 50.0 µm; a bimodal particle size distribution at about 10.0 µm and 45.0 to 50.0 µm; a bimodal particle size distribution at about 8.0 µm to 10.0 µm and 50.0 µm; a trimodal particle size distribution at 1.0 to 2.6 µm, 6.5 to 13.0 µm, and 45.0 to 58.0 µm; a trimodal particle size distribution of 1.6 to 2.6 µm, 6.5 to 10.0 µm, and 45.0 to 50.0 µm; a trimodal particle size distribution of 1.6 to 2.6 µm, 6.5 to 10.0 µm, and 45.0 to 75.0 µm; a trimodal particle size distribution of about 1.6 µm, about 8.0 µm, and about 50.0 µm; a trimodal particle size distribution of about 1.0 µm, about 10.0 µm, and about 50.0 µm; a trimodal particle size distribution of about 1.6 µm, about 10.0 µm, and about 45.0 µm; a trimodal particle size distribution of about 1.6 µm, about 10.0 µM, and about 50.0 µm; a trimodal particle size distribution of about 1.3 µm, about 8.0 µm, and about 58.0 µm; a trimodal particle size distribution of about 1.6 µm, about 13.0 µm, and about 75.0 µm; and a tetramodal, a pentamodal, and a hexamodal particle size distribution of any combinations, etc. The micron inorganic particles having a bimodal or multimodal particle size distribution may also be referred to as graded particles. The particle size distribution having a specific distribution pattern can be obtained by sieving the particles based on the particle size and then mixing particles with corresponding sizes. For example, large-size inorganic particles may be dry or wet ground into small-size inorganic particles, and then subjected to air classification to obtain micron inorganic particles having a narrow particle size distribution, which are then further mixed to attain an intended particle size distribution pattern. When the particle size distribution is bimodal, the particles having a particle size or size range at the peak may account for, independently from each other, at least about 30% to about 70%, for example, about 30%, about 35%, about 40%, about 45%, about 50%, about 55%, about 60%, about 65%, about 70%, etc., of the total weight of the micron inorganic particles. When the particle size distribution is trimodal, the particles having a particle size or size range at the peak may account for, independently from each other, at least about 20% to about 50% for example, about 20%, about 25%, about 27%, about 29%, about 30%, about 31%, about 33%, about 35%, about 37%, about 40%, about 45%, about 50%, etc., of the total weight of the micron inorganic particles. Without being bound by theory, the use of graded particles in the non-calcined cementitious composition or the non-calcined concrete compositions can enhance the physical and mechanical performance of the concrete prepared (for example, compressive strength, etc.).

The particle size of the inorganic particles may also be at a millimeter scale and range from ≥0.1 mm to 50.0 mm.

Alternatively, without being bound by theory, the particle size of the inorganic particles may also be at a nanometer scale.

The inorganic particles contained in the composition of the present invention do not need to be calcinated but still allow the composition to exhibit the property of a binder material after they are mixed with other components in the composition. After the components are mixed, a binder material having properties similar to those of a traditional cement is prepared, whereby carbon emissions are reduced greatly and energy is saved.

B. Aluminum-Oxygen Compound

The aluminum-oxygen compound contained in the composition of the present invention is a material mainly composed of aluminum and oxygen, and may be, when in a form of a compound, an oxyacid of aluminum and derivatives thereof (for example, a salt, such as an alkali or alkali earth metal salt), an oxide of aluminum and a hydroxide of aluminum; and may also comprise a mixture mainly composed of these compounds. Examples include, but are not limited to, sodium aluminate, calcium aluminate, alumina, aluminum hydroxide, and high-alumina cement, or any combination thereof. Without being bound by theory, the aluminum-oxygen compound functions to stabilize the coagulation between the components so as to provide stable physical properties similar to those of cement.

In the non-calcined cementitious composition of the present invention, the content of the aluminum-oxygen compound may be, but is not limited to, at least 1.9%, at least 4.2%, at least 5.0%, at least 8.0% and at least 9.5% of the total weight of the composition; and may also be, but is not limited to, at most 21.0%, at most 18.0%, at most 14.5%, at most 8.5%, at most 7.5%; at most 6.0%, and at most 5.0% of the total weight of the composition; or any range constituted by the values above as an upper and a lower limit thereof.

In the non-calcined concrete composition of the present invention, the content of the aluminum-oxygen compound may be, but is not limited to, at least 1.1%, at least 2.2%, at least 2.8%, at least 4.8%, and at least 5.5% of the total weight of the composition; and may also be, but is not limited to, at most 12.0%, at most 10.0%, at most 8.0%, at most 5.5%, at most 5.0%, at most 3.0%, and at most 2.0% of the total weight of the composition; or any range constituted by the values above as an upper and a lower limit thereof.

In a preferred aspect, the aluminum-oxygen compound includes aluminum hydroxide or a mixture containing aluminum hydroxide, which can enhance the strength of concrete after high-temperature curing.

C. Nanocolloidal Silica

The nanocolloidal silica contained in the composition of the present invention is a conventionally known particulate silica suspended in a liquid phase and having a nano-grade particle size. The nanocolloidal silica may also be aggregated to form a large particle or to form a network structure. The nanocolloidal silica may be commercially available or prepared with a silicon-containing material.

The solid content of the nanocolloidal silica may be 20 to 50 wt. %, preferably 30 to 48 wt. %, and more preferably 35 to 45 wt. %, for example, about 20, about 25, about 30, about 35, about 36, about 37, about 38, about 39, about 40, about 42, about 44, about 45, about 46, about 48, and about 50 wt. %; or any range constituted by the endpoints above as an upper and a lower limit thereof. The particle size of the particulate silica contained in the nanocolloidal silica may be 8 to 90 nm, preferably 10 to 85 ID nm, and more preferably 15 to 80 nm; or may be about 8, about 10, about 15, about 18, about 30, about 50, about 60, about 80, and about 90 nm; or any range constituted by the endpoints above as an upper and a lower limit thereof.

The nanocolloidal silica may also have a bimodal particle size distribution at, for example, about 10 nm and about 90 nm, about 18 nm and about 90 nm, about 18 nm and about 80 nm, about 10 nm and about 80 nm, about 10 nm and about 30 nm, about 30 nm and about 80 nm, about 10 nm and about 50 nm, and various combinations. When the particle size distribution is bimodal, the particles having a particle size or size range at the peak may account for, independently from each other, at least 30% to 70%, for example, about 30%, about 35%, about 40%, about 45%, about 50%, about 55%, about 60%, about 65%, and about 70% of the total weight of the nanocolloidal silica. The particle size distribution having a specific distribution pattern can be obtained by mixing nanocolloidal silica having different particle sizes.

In the non-calcined cementitious composition of the present invention, the content of the nanocolloidal silica may be, but is not limited to, 17.0% to 36.0%, preferably 19.0% to 33.0%, and more preferably 21.0% to 32.0% of the total weight of the composition.

In the non-calcined concrete composition of the present invention, the content of the nanocolloidal silica may be, but is not limited to, 8.5% to 17.0%, preferably 9.5% to 15.0%, and more preferably 10.5% to 13.0% of the total weight of the composition.

D. Coagulation Controlling Agent

The coagulation controlling agent contained in the composition of the present invention functions to control the coagulation time of the components in admixture, such that a desired application time can be provided. Examples include a hydroxycarboxylic acid or a salt thereof; a starch ether or a functionalized starch ether and the like, for example, citric acid, tartaric acid, gluconic acid, salicylic acid and an alkali metal salt of these acids, hydroxymethyl starch ether, hydroxyethyl starch ether, hydroxypropyl starch ether or any combination thereof.

In the non-calcined cementitious composition of the present invention, the content of the coagulation controlling agent may be, but is not limited to, 0.2% to 6.5%, preferably 1.0% to 5.5%, and more preferably 2.2% to 5.0% of the total weight of the composition.

In the non-calcined concrete composition of the present invention, the content of the coagulation controlling agent may be, but is not limited to, 0.15% to 3.5%, preferably 0.6% to 3.0%, and more preferably 1.1% to 2.5% of the total weight of the composition.

E. Optional Additives

The composition of the present invention also comprises one or more optional additives, for example, but not limited to, a coagulation aid, active silica, a water-reducing agent, and so on, for the purpose of controlling the composition to meet different requirements. Detailed description is given below.

(i) Coagulation Aid

The composition of the present invention may additionally comprise a coagulation aid to further facilitate the coagulation reaction between the components of the present invention. The coagulation aid includes an oxide, hydroxide, sulfate or carbonate of an alkali metal or alkali earth metal. Examples include, but are not limited to, lithium oxide, magnesium oxide, calcium oxide, barium oxide, sodium hydroxide, magnesium hydroxide, calcium hydroxide, barium hydroxide, sodium sulfate, magnesium sulfate, calcium sulfate, lithium carbonate, and so on.

Therefore, in a preferred aspect of the present invention, a non-calcined cementitious composition containing a coagulation aid is provided, which comprises:

(a) micron inorganic particles having a particle size ranging from 1.0 to 100 μm of about 30% to 86%, preferably 40% to 80%, and more preferably 50% to 74% based on the total weight of the composition;

(b) an aluminum-oxygen compound with a content that may be, but is not limited to, at least 1.8%, at least 4.0%, at least 4.8%, at least 8.0%, or at least 9.2% of the total weight of the composition; or may be, but is not limited to, at most 20.0%, at most 17.5%, or at most 12.5% of the total weight of the composition; or any range constituted by the values above as an upper and a lower limit thereof;

(c) nanocolloidal silica with a content that may be, but is not limited to, 15.0% to 35.0%, preferably 18.0% to 32.0%, and more preferably 20.0% to 30.0% of the total weight of the composition;

(d) a coagulation controlling agent with a content that may be, but is not limited to, 0.18% to 6.0%, preferably 0.9% to 5.0%, and more preferably 2.0% to 4.5% of the total weight of the composition; and (i) a coagulation aid with a content that may be, but is not limited to, at least 2.2%, at least 2.6% or at least 3.0%; or at most 6.5%, at most 5.8%, at most 5.0% or at most 3.0% of the total weight of the composition; or any range constituted by the values above as an upper and a lower limit thereof.

After the components in the composition are mixed, without calcination, the composition can serve as a binder material as the cement in the construction material does.

Further, in a preferred aspect of the present invention, a non-calcined concrete composition containing a coagulation aid is provided, which comprises:

(a) inorganic particles of about 65% to 90%, preferably 68% to 88%, and more preferably 70% to 85% based on the total weight of the composition;

(b) an aluminum-oxygen compound with a content that may be, but is not limited to, at least 1.0%, at least 2.0%, at least 2.5%, at least 4.6%, or at least 5.2% of the total weight of the composition; or may be, but is not limited to, at most 10.0%, at most 8.5%, at most 6.0%, at most 5.2%, at most 4.6%, at most 2.5%, or at most 2.0% of the total weight of the composition; or any range constituted by the values above as an upper and a lower limit thereof;

(c) nanocolloidal silica with a content that may be, but is not limited to, 7.5% to 15.0%, preferably 9.0% to 13.0%, and more preferably 10.0% to 12.5% of the total weight of the composition;

(d) a coagulation controlling agent with a content that may be, but is not limited to, 0.1% to 3.0%, preferably 0.5% to 2.5%, and more preferably 1.0% to 2.2% of the total weight of the composition; and (i) a coagulation aid, comprising an oxide, hydroxide, sulfate or carbonate of an alkali metal or alkali earth metal and having a content that may be, but is not limited to, at least 1.0%, at least 1.5% or at least 2.0%; or at most 3.0%, at most 2.8%, at most 2.4% or at most 2.0% of the total weight of the composition; or any range constituted by the values above as an upper and a lower limit thereof, wherein the inorganic particles comprise micron inorganic particles having a particle size ranging from 1.0 to 100 μm, and the micron inorganic particles account for 25% to 45% of the total weight of the inorganic particles.

(II) Active Silica

The active silica useful in the composition of the present invention is a conventionally known silica having a low overall density and a high specific surface area. Without being bound by theory, the addition of the active silica to the composition makes the cementitious material formed with the composition of the present invention more watertight such that the composition of the present invention has a broader range of applications. The common active silica may be amorphous silica, such as fumed silica and precipitated silica, where the primary particles of which are at nanometer scale and may also be aggregated to form micro-aggregates at micron level. The particle size of the primary particles of the fumed silica may be, for example, but is not limited to, 5 to 50 nm; the particle size of the formed micro-aggregates may be, but is not limited to, 1 to 20 μm; and the specific surface area may be, but is not limited to, 50 to 600 $m^2/g$, for example, 140 to 220 $m^2/g$. The particle size of the primary particles of the precipitated silica may be, for example, but is not limited to, 5 to 100 nm; the particle size of the formed micro-aggregates may be, but is not limited to, 1 to 40 μm; and the specific surface area may be, but is not limited to, 5 to 100 $m^2/g$.

In the non-calcined cementitious composition of the present invention, the content of the active silica may be, but is not limited to, at least 0.3%, at least 0.5%, at least 0.8%, at most 5.0%, at most 4.5%, or at most 4.2% of the total weight of the composition, or any range constituted by any combination thereof as an upper and a lower value thereof.

In the non-calcined concrete composition of the present invention, the content of the active silica may be, but is not limited to, at least 0.2%, at least 0.3%, at least 0.5%; at most 2.5%, at most 2%, or at most 1.8% of the total weight of the composition, or any range constituted by any combination thereof as an upper and a lower limit thereof.

(iii) Water-Reducing Agent

The water-reducing agents useful in the present invention are those facilitating the absorption of water after the components in the composition are mixed. Examples include lignin-based water-reducing agents, naphthalenesulfonic acid-based water-reducing agents, water soluble resin-based water-reducing agent, and polycarboxylic acids, for example, calcium lignosulfonate, sodium lignosulfonate, magnesium lignosulfonate, sulfonated lignin, naphthalene-sulfonates, coumarone resin, and so on.

The non-calcined cementitious composition of the present invention can exhibit behavior similar to cement and meet the property requirements conforming to the construction specifications after the components being mixed at ambient temperature. Since the raw materials used do not comprise the main component limestone of traditional cements as an essential component, a non-calcined concrete (where even if it may contain limestone) exhibiting properties comparable to or better than those of existing concretes can be prepared with the non-calcined concrete composition of the present invention without calcination. Therefore, the energy needed for high-temperature calcination is greatly reduced, and the problem of pollution resulting from high-temperature calcination is avoided. Without being bound by theory, carbon emissions can be reduced by at least about 40% to about 70% by using the non-calcined cementitious composition of the present invention compared with the traditional Portland cement. In addition, the raw materials used are more environmentally friendly and readily available, and have less impact on the environment, thus reducing the environmental and economic costs.

Preparation Method of Non-Calcined Cementitious Composition

The non-calcined cementitious composition of the present invention is formed by combining the selected components. In a preferred aspect of the present invention, the non-calcined cementitious composition is packaged into two portions, one comprising the micron inorganic particles and the aluminum-oxygen compound, and the other comprising the nanocolloidal silica and the coagulation controlling agent. Preferably, the two portions are not in contact with each other during shipping or prior to use of the composition. In another preferred aspect of the present invention, the non-calcined cementitious composition of the present invention is packaged into two portions, one comprising the micron inorganic particles, the aluminum-oxygen compound and the coagulation aid, and the other comprising the nanocolloidal silica and the coagulation controlling agent. Preferably, the coagulation aid is not in contact with the nanocolloidal silica during shipping or prior to use of the composition. In one aspect, the non-calcined cementitious composition is packaged into two portions, one comprising all the components in the form of a solid, and the other comprising the components in the form of a liquid (for example, a solution, a suspension, or a sol). Preferably, the two portions are not in contact with each other during shipping or prior to use of the composition.

Preparation Method of Non-Calcined Concrete Composition

The non-calcined concrete composition of the present invention is formed by combining the selected components. In a preferred aspect of the present invention, the non-calcined concrete composition is packaged into two portions, one comprising the inorganic particles (comprising the micron inorganic particles) and the aluminum-oxygen compound, and the other comprising the nanocolloidal silica and the coagulation controlling agent. Preferably, the two portions are not in contact with each other during shipping or prior to use of the composition. In another preferred aspect of the present invention, the non-calcined concrete composition of the present invention is packaged into two portions, one comprising the inorganic particles (comprising the micron inorganic particles), the aluminum-oxygen compound and the coagulation aid, and the other comprising the nanocolloidal silica and the coagulation controlling agent. Preferably, the coagulation aid is not in contact with the nanocolloidal silica during shipping or prior to use of the composition. In one aspect, the non-calcined concrete composition is packaged into two portions, one comprising all the components in the form of a solid, and the other comprising the components in the form of a liquid (for example, a solution, a suspension, or a sol). Preferably, the two portions are not in contact with each other during shipping or prior to use of the composition.

Preparation Method of Non-Calcined Concrete

Most of the components contained in the non-calcined cementitious composition and the non-calcined concrete composition of the present invention need no calcination, and only a few components need to be pre-treated by low-temperature calcination (for example, the optional coagulation aid, such as magnesium oxide).

The concrete generally comprises a binder material (cement), water, an aggregate, and other components. The aggregate may be any material applicable in the engineering, for example, materials derived from various natural ores or rocks, quartz sand, terrestrial sandstone, silica sand, river sand, sea sand, reservoir silt or any combination of the foregoing, and inevitable impurities contained therein. In one embodiment, the inorganic particles comprise quartz sand, gravel or both, and the quartz sand and gravel can be mixed at any ratio when both of them are present.

Therefore, the non-calcined cementitious composition of the present invention can be used as a binder material for preparing a non-calcined concrete. For example, the non-calcined cementitious composition of the present invention can be mixed with the aggregate and other components to prepare a concrete. For example, the aggregate can be first mixed with the micron inorganic particles, and then with the aluminum-oxygen compound uniformly; and subsequently, the nanocolloidal silica and the coagulation controlling agent can be added and the components are blended to obtain a non-calcined concrete. Alternatively, the components other than the nanocolloidal silica and the coagulation controlling agent can be mixed until uniform, and then the nanocolloidal silica and the coagulation controlling agent can be added sequentially or simultaneously and the components are blended to prepare a non-calcined concrete.

In one aspect where a non-calcined concrete is prepared with a non-calcined cementitious composition comprising a further added optional component (for example, one or more of a coagulation aid, active silica, and a water-reducing agent), the aggregate is first mixed with the micron inorganic particles, and then with the coagulation aid and the aluminum-oxygen compound uniformly; and subsequently, the nanocolloidal silica and the coagulation controlling agent are added and the components are blended to obtain a non-calcined concrete. In another aspect, the aggregate and the micron inorganic particles are first mixed, and then with the aluminum-oxygen compound uniformly; and subsequently, the nanocolloidal silica, the coagulation controlling agent and the active silica are added and the components are blended to obtain a non-calcined concrete. In another aspect, the aggregate is mixed with the micron inorganic particles, and then with the aluminum-oxygen compound and the coagulation aid uniformly: and subsequently, the nanocolloidal silica, the coagulation controlling agent and the active silica are added and the components are blended to obtain a non-calcined concrete. In another aspect, the aggregate is mixed with the micron inorganic particles, and then with the water-reducing agent and the aluminum-oxygen compound uniformly; and subsequently, the nanocolloidal silica and the coagulation controlling agent are added and the components are blended to obtain a non-calcined concrete. Alternatively, in the above aspects, the components other than the nanocolloidal silica, the coagulation controlling agent and the active silica (if present) are first uniformly mixed, and then the nanocolloidal silica, the coagulation controlling agent and the active silica (if present) are added and the components are blended to prepare a non-calcined concrete. Alternatively, in the above aspects, the components in the form of a solid are first mixed, and then the components in the form of a liquid (for example, a solution, a suspension, and a sol) are added and the components are blended to prepare a non-calcined concrete.

Further, the concrete may also be prepared with the non-calcined concrete composition provided in the present invention. The inorganic particles are first mixed uniformly, and then other components are added to prepare a non-calcined concrete. For example, the inorganic particles are mixed with the micron inorganic particles at a ratio as described above, and then with the aluminum-oxygen compound uniformly; and subsequently, the nanocolloidal silica and the coagulation controlling agent are added and the components are blended to obtain a non-calcined concrete. In one embodiment where a concrete is prepared with a non-calcined concrete composition comprising a further added optional component (for example, one or more of a coagulation aid, active silica, and a water-reducing agent), the inorganic particles are mixed with the micron inorganic particles at a ratio as described above, and then with the aluminum-oxygen compound and the coagulation aid uniformly; and subsequently the nanocolloidal silica and the coagulation controlling agent are added and the components are blended to obtain a non-calcined concrete. In another embodiment, the inorganic particles and the micron inorganic particles are mixed at a ratio as described above, and then mixed with the aluminum-oxygen compound uniformly; and subsequently, the nanocolloidal silica, the coagulation controlling agent, and the active silica are added and the components are blended to obtain a non-calcined concrete. In another embodiment, the inorganic particles are mixed with the micron inorganic particles at a ratio as described above, and then with the aluminum-oxygen compound and the coagulation aid uniformly; and subsequently, the nanocolloidal silica, the coagulation controlling agent, and the active silica are added and the components are blended to obtain a non-calcined concrete. In another specific embodiment, the inorganic particles are mixed with the micron inorganic particles at a ratio as described above, and then with the water-reducing agent and the aluminum-oxygen compound uniformly; and subsequently, the nanocolloidal silica and the coagulation controlling agent are added and the components are blended to obtain a non-calcined concrete. Alternatively, in the above embodiments, the components other than the nanocolloidal silica, the coagulation controlling agent and the active silica (if present) are first mixed uniformly, and then the nanocolloidal silica, the coagulation controlling agent and the active silica (if present) are added and the components are blended to prepare a non-calcined concrete. Alternatively, in the above aspects, the components in the form of a solid are first mixed, and then the components in the form of a liquid (for example, a solution, a suspension, and a sol) are added and the components are blended to prepare a non-calcined concrete.

The aggregate for preparing the concrete may include terrestrial sandstone, silica sand, river sand, sea sand, reservoir silt, and so on. In one embodiment, the inorganic particles of the present invention are also regarded as an aggregate. In a preferred embodiment, the aggregate is treated by salt removal (including the removal of cations and/or anions) prior to use.

The non-calcined concrete prepared with the non-calcined cementitious composition or the non-calcined concrete composition of the present invention has physical and mechanical properties comparable to or even better than those of a traditional concrete prepared with traditional Portland cement. For example, in one embodiment, the non-calcined concrete prepared with the non-calcined cementitious composition or the non-calcined concrete composition of the present invention exhibits a mechanically acceptable compressive strength in a stress and strain test according to the CNS 1010 (ASTM C109) Standard or the CNS 1232 (ASTM C39) Standard, for example, a 28-day compressive strength of at least 1,800 psi, at least 2,000 psi, preferably at least 3,000 psi, preferably at least 4,500 psi, and more preferably at least 6,000 psi. In a more preferred embodiment, the non-calcined concrete prepared with the non-calcined cementitious composition or the non-calcined concrete composition of the present invention exhibits a 28-day compressive strength of at least 8,000 psi, at least 10,000 psi, at least 12,000 psi or at least 14,000 psi. In one embodiment, the non-calcined concrete prepared with the non-calcined cementitious composition or the non-calcined concrete composition of the present invention exhibits a mechanically acceptable flexural strength in a flexural strength test according to the CNS 1238 (ASTM C348) Standard, for example, a 28-day flexural strength of at least 200 psi, preferably at least 300 psi, preferably at least 450 psi, and more preferably at least 600 psi. In one embodiment, the non-calcined concrete prepared with the non-calcined cementitious composition or the non-calcined concrete composition of the present invention exhibits a mechanically acceptable splitting tensile strength in a splitting tensile strength test according to the CNS 3801 (ASTM C496) Standard, for example, a 28-day splitting tensile strength of at least 200 psi, preferably at least 300 psi, preferably at least 450 psi, and more preferably at least 600 psi. In one specific embodiment, the non-calcined concrete prepared with the non-calcined cementitious composition or the non-calcined concrete composition of the present invention exhibits a mechanically acceptable linear shrinkage in a linear shrinkage test according to the CNS 14603 (ASTM C157) Standard, for example, a 28-day linear shrinkage of at most 1.500μ, preferably at most 1,200μ, more preferably at most 600μ, more preferably at most 400μ, and more preferably at most 200μ.

In one embodiment, the non-calcined concrete prepared with the non-calcined cementitious composition or the non-calcined concrete composition of the present invention exhibits a mechanically acceptable compressive strength in a compressive strength test of cylindrical concrete specimen according to the CNS 1232 (ASTM C39) Standard, for example, a compressive strength of at least 4,500 psi, preferably at least 5,000 psi, and more preferably at least 6000 psi.

The following examples are provided to make the present invention more comprehensible to those of ordinary skill in the art to which the present invention pertains, but are not intended to limit the scope of the invention.

EXAMPLES

Example 1

A non-calcined cementitious composition having components as listed in Table 1 below was prepared.

TABLE 1

| | Non-calcined cementitious composition (parts by weight) | | | | | | | |
|---|---|---|---|---|---|---|---|---|
| | Raw material | | | | | | | |
| | Micron inorganic particles | | | Coagulation | Aluminum-oxygen compound/ | Nanocolloidal silica | Coagulation controlling | Active silica/ |
| No. | 1.6 μm | 10 μm | 50 μm | aid/content | content | content | agent/content | content |
| 1A | — | — | SiO₂ 27.8 | — | Al₂O₃ 8.8 | 12.1 | Citric acid 2.2 | — |
| 2A | — | SiO₂ 27.8 | — | — | Al₂O₃ 8.8 | 12.1 | Citric acid 2.2 | — |
| 3A | SiO₂ 27.8 | — | — | — | Al₂O₃ 8.8 | 12.1 | Citric acid 2.2 | — |
| 4A | — | — | SiO₂ 27.8 | — | Al(OH)₃ 8.8 | 12.1 | Citric acid 2.2 | — |
| 5A | — | SiO₂ 27.8 | — | — | Al(OH)₃ 8.8 | 12.1 | Citric acid 2.2 | — |
| 6A | SiO₂ 27.8 | — | — | — | Al(OH)₃ 8.8 | 12.1 | Citric acid 2.2 | — |
| 7A | — | — | SiO₂ 28.1 | MgO 2.2 | High-alumina cement 5.6 | 12.2 | Citric acid 2.2 | — |
| 8A | — | SiO₂ 28.1 | — | MgO 2.2 | High-alumina cement/ 5.6 | 12.2 | Citric acid/ 2.2 | — |
| 9A | SiO₂ 28.1 | — | — | MgO 2.2 | High-alumina cement/ 5.6 | 12.2 | Citric acid/ 2.2 | — |
| 10A | — | SiO₂ 18.3 | SiO₂ 9.8 | MgO 2.2 | High-alumina cement 5.6 | 12.2 | Citric acid 2.2 | — |
| 11A | SiO₂ 18.3 | — | SiO₂ 9.8 | MgO 2.2 | High-alumina cement 5.6 | 12.2 | Citric acid 2.2 | — |
| 12A | SiO₂ 18.3 | SiO₂ 9.8 | — | MgO 2.2 | High-alumina cement 5.6 | 12.2 | Citric acid 2.2 | — |
| 13A | SiO₂ 11.1 | SiO₂ 11.1 | SiO₂ 5.9 | MgO 2.2 | High-alumina cement 5.6 | 12.2 | Citric acid 2.2 | — |
| 14A | — | — | SiO₂ 27.2 | MgO 2.2 | Al₂O₃ 8.6 | 11.8 | Citric acid 2.2 | — |
| 15A | — | SiO₂ 27.2 | — | MgO 2.2 | Al₂O₃ 8.6 | 11.8 | Citric acid 2.2 | — |
| 16A | SiO₂ 27.2 | — | — | MgO 2.2 | Al₂O₃ 8.6 | 11.8 | Citric acid 2.2 | — |
| 17A | — | — | SiO₂ 27.2 | MgO 2.2 | Al(OH)₃ 8.6 | 11.8 | Citric acid 2.2 | — |
| 18A | — | SiO₂ 27.2 | — | MgO 2.2 | Al(OH)₃ 8.6 | 11.8 | Citric acid 2.2 | — |
| 19A | SiO₂ 27.2 | — | — | MgO 2.2 | Al(OH)₃ 8.6 | 11.8 | Citric acid 2.2 | — |
| 20A | SiO₂ 11.0 | SiO₂ 11.0 | SiO₂ 5.8 | MgO 2.2 | High-alumina cement/Al(OH)₃ 5.5/1.4 | 12.1 | Citric acid 2.2 | — |
| 21A | SiO₂ 18.1 | — | SiO₂ 9.7 | — | Al₂O₃ 8.8 | 12.1 | Citric acid 2.2 | — |
| 22A | SiO₂ 18.1 | — | SiO₂ 9.7 | — | Al(OH)₃ 8.8 | 12.1 | Citric acid 2.2 | — |
| 23A | SiO₂ 10.7 | SiO₂ 10.7 | SiO₂ 5.7 | MgO 2.1 | High-alumina cement/Al(OH)₃ 5.4/3.6 | 11.8 | Citric acid 2.1 | — |
| 24A | SiO₂ 10.8 | SiO₂ 10.8 | SiO₂ 5.7 | MgO 2.2 | High-alumina cement/Al(OH)₃ 5.4/2.7 | 11.9 | Citric acid 2.2 | — |
| 25A | SiO₂ 10.6 | SiO₂ 10.6 | SiO₂ 5.6 | MgO 2.1 | High-alumina cement/Al(OH)₃ 5.3/4.4 | 11.7 | Citric acid 2.1 | — |
| 26A | SiO₂ 11.0 | SiO₂ 10.0 | SiO₂ 5.8 | MgO 2.2 | High-alumina cement/Al(OH)₃ 5.5/2.2 | 12.1 | Citric acid 2.2 | — |
| 27A | — | SiO₂ 28.1 | — | MgO 2.2 | High-alumina cement 5.6 | 12.2 | Tartaric acid/ 2.2 | — |
| 28A | SiO₂ 11.1 | SiO₂ 11.1 | SiO₂ 5.9 | MgO 2.2 | High-alumina cement 5.6 | 7 nm (Solid content 20%) 12.2 | Citric acid 2.2 | — |

TABLE 1-continued

Non-calcined cementitious composition (parts by weight)

| | Raw material | | | | | | | |
|---|---|---|---|---|---|---|---|---|
| | Micron inorganic particles | | | Coagulation | Aluminum-oxygen compound/ | Nanocolloidal silica | Coagulation controlling | Active silica/ |
| No. | 1.6 μm | 10 μm | 50 μm | aid/content | content | content | agent/content | content |
| 29A | SiO$_2$ 11.1 | SiO$_2$ 11.1 | SiO$_2$ 5.9 | MgO 2.2 | High-alumina cement 5.6 | 18 nm (Solid content 40%) 12.2 | Citric acid 2.2 | — |
| 30A | SiO$_2$ 11.1 | SiO$_2$ 11.1 | SiO$_2$ 5.9 | MgO 2.2 | High-alumina cement 5.6 | 11 nm (Solid content 30%) 12.2 | Citric acid 2.2 | — |
| 31A | SiO$_2$ 11.1 | SiO$_2$ 11.1 | SiO$_2$ 5.9 | MgCO$_3$ 2.6 | High-alumina cement 5.6 | 11.9 | Citric acid 2.6 | — |
| 32A | SiO$_2$ 11.1 | SiO$_2$ 11.1 | SiO$_2$ 5.9 | CaCO$_3$ 2.2 | High-alumina cement 5.6 | 12.2 | Citric acid 2.2 | — |
| 33A | SiO$_2$ 17.7 | — | SiO$_2$ 9.5 | MgO 2.2 | Al$_2$O$_3$ 8.6 | 11.8 | Citric acid 2.2 | — |
| 34A | SiO$_2$ 17.7 | — | SiO$_2$ 9.5 | MgO 2.2 | Al(OH)$_3$ 8.6 | 11.8 | Citric acid 2.2 | — |
| 35A | SiO$_2$ 8.1 | SiO$_2$ 12.0 | SiO$_2$ 6.3 | — | High-alumina cement 6.1 | 12.2 | Citric acid 1.8 | — |
| 36A | SiO$_2$ 11.0 | SiO$_2$ 10.0 | SiO$_2$ 5.8 | MgO 2.2 | Al$_2$O$_3$/Al(OH)$_3$ 5.5/2.2 | 12.1 | Citric acid 2.2 | — |
| 400A | SiO$_2$ 8.0 | SiO$_2$ 11.8 | SiO$_2$ 6.3 | MgO 2.1 | High-alumina cement 5.9 | 11.9 | Citric acid 1.3 | — |
| 410A | SiO$_2$ 8.0 | SiO$_2$ 11.7 | SiO$_2$ 6.2 | MgO 2.1 | High-alumina cement 5.9 | 11.9 | Citric acid 1.8 | 15 μm/0.3 |
| 411A | SiO$_2$ 7.9 | SiO$_2$ 11.7 | SiO$_2$ 6.2 | MgO 2.3 | High-alumina cement 5.9 | 11.9 | Citric acid 1.3 | 15 μm/0.5 |
| 412A | SiO$_2$ 7.9 | SiO$_2$ 11.6 | SiO$_2$ 6.2 | MgO 2.3 | High-alumina cement 5.8 | 11.8 | Citric acid 1.9 | 15 μm/0.5 |
| 413A | SiO$_2$ 7.9 | SiO$_2$ 11.7 | SiO$_2$ 6.2 | MgO 2.0 | High-alumina cement 5.8 | 11.8 | Citric acid 1.8 | 15 μm/0.5 |
| 414A | SiO$_2$ 7.8 | SiO$_2$ 11.6 | SiO$_2$ 6.1 | MgO 2.3 | High-alumina cement 5.8 | 11.7 | Citric acid 1.8 | 15 μm/1.0 |
| 415A | SiO$_2$ 7.8 | SiO$_2$ 11.5 | SiO$_2$ 6.1 | MgO 2.3 | High-alumina cement 5.7 | 11.7 | Citric acid 1.8 | 15 μm/2.0 |
| 416A | SiO$_2$ 8.0 | SiO$_2$ 11.8 | SiO$_2$ 6.2 | MgO 1.8 | High-alumina cement 5.9 | 11.9 | Citric acid 1.3 | 5~8 μm/0.5 |
| 4001A | silicon carbide 18 μm 27.0 | | | MgO 1.5 | High-alumina cement 4.9 | 10.0 | Citric acid 1.1 | 15 μm/0.4 |
| 501A | River sand 11.1 | River sand 11.1 | River sand 5.9 | MgO 2.2 | High-alumina cement 5.6 | 12.2 | Citric acid 2.2 | — |
| 502A | River sand 19.4 | — | River sand 8.7 | MgO 2.2 | High-alumina cement 5.6 | 12.2 | Citric acid 2.2 | — |
| 503A | River sand 19.4 | River sand 8.7 | — | MgO 2.2 | High-alumina cement 5.6 | 12.2 | Citric acid 2.2 | — |
| 504A | River sand 11.1 | River sand 11.1 | River sand 5.9 | MgO 2.2 | High-alumina cement 5.5 | 12.2 | Citric acid 2.2 | 15 μm/0.4 |
| 505A | River sand 19.4 | River sand 8.6 | — | MgO 2.2 | High-alumina cement 5.5 | 12.2 | Citric acid 2.2 | 15 μm/0.4 |
| 506A | River sand 19.4 | — | River sand 8.6 | MgO 2.2 | High-alumina cement 5.5 | 12.2 | Citric acid 2.2 | 15 μm/0.4 |
| 601A | SiO$_2$ 7.9 | SiO$_2$ 11.7 | SiO$_2$ 6.2 | MgO 2.3 | High-alumina cement 5.9 | 11.9 | Citric acid 1.3 | 15 μm/0.5 |

TABLE 1-continued

Non-calcined cementitious composition (parts by weight)

| | Raw material | | | | | | |
|---|---|---|---|---|---|---|---|
| | Micron inorganic particles | | | Coagulation | Aluminum-oxygen compound/ | Nanocolloidal silica | Coagulation controlling | Active silica/ |
| No. | 1.6 µm | 10 µm | 50 µm | aid/content | content | content | agent/content | content |
| C1A | — | — | SiO₂ (45 µm) 27.7 | MgO 2.2 | — | 12.7 | Citric acid 1.1 | — |
| C2A | SiO₂ 8.0 | SiO₂ 11.8 | SiO₂ (45 µm) 6.2 | MgO 1.8 | — | 11.6 | — | — |

Unless indicated otherwise, the nanocolloidal silica was prepared by mixing nanocolloidal silica with 18 nm and nanocolloidal silica with 80 nm at a ratio of about 8:2 (solid content: 40 wt. %).

A non-calcined cementitious composition having components as listed in Table 1A below was prepared.

TABLE 1A non-calcined cementitious composition (parts by weight)

| | Raw material | | | | | | | | |
|---|---|---|---|---|---|---|---|---|---|
| | Micron inorganic particles | | | Coagulation | Aluminum-oxygen | Nanocolloidal silica | | | Coagulation controlling |
| No. | 1.6 µm | 10 µm | 45 µm | aid/content | compound/content | 80 nm | 15 nm | 10 nm | agent/content |
| 511A | | | | | | 0.3 | 6.0 | 8.4 | |
| 512A | | | | | | 9.6 | 2.4 | — | |
| 513A | | | | | | 7.2 | 4.8 | — | |
| 514A | | | | | | 4.8 | 7.2 | — | |
| 515A | | | | | | 2.4 | 9.6 | — | |
| 516A | | | | | | — | 12.0 | — | |
| 517A | | | | | | — | — | 12.0 | |
| 518A | | | | | | 9.6 | — | 2.4 | |
| 519A | | | | | | 7.2 | — | 4.8 | |

In Examples 2 to 9 that follow, the compressive strength is tested in accordance with the CNS1010 (ASTM C109) Standard, except for the duration of testing the strength, which should be dominated by those listed herein.

Example 2

A non-calcined concrete composition having components as listed in the table below was prepared. The inorganic particles (aggregate) and the micron inorganic particles (SiO₂) were mixed according to the weight ratio shown in Table 2, and then mixed uniformly with the aluminum-oxygen compound. Subsequently, the nanocolloidal silica and the coagulation controlling agent were added and the components were blended, and the compressive strength was measured after curing for 28 days.

TABLE 2

| | Raw material | | | | | |
|---|---|---|---|---|---|---|
| No. | Aggregate/content | Particle size of micron inorganic particles (SiO₂)/content | Species of aluminum-oxygen compound/content | Nanocolloidal silica | Species of coagulation controlling agent/content | 28-day strength (psi) |
| 1 | Quartz sand 49.1% | 50 µm 27.8% | $Al_2O_3$ 8.8% | 12.1% | Citric acid 2.2% | 2350 |
| 2 | Quartz sand 49.1% | 10 µm 27.8% | $Al_2O_3$ 8.8% | 12.1% | Citric acid 2.2% | 2125 |
| 3 | Quartz sand 49.1% | 1.6 µm 27.8% | $Al_2O_3$ 8.8% | 12.1% | Citric acid 2.2% | 2561 |
| 4 | Quartz sand 49.1% | 50 µm 27.8% | $Al(OH)_3$ 8.8% | 12.1% | Citric acid 2.2% | 3350 |
| 5 | Quartz sand 49.1% | 10 µm 27.8% | $Al(OH)_3$ 8.8% | 12.1% | Citric acid 2.2% | 3119 |
| 6 | Quartz sand 49.1% | 1.6 µm 27.8% | $Al(OH)_3$ 8.8% | 12.1% | Citric acid 2.2% | 3011 |

TABLE 2-continued

| No. | Aggregate/content | Particle size of micron inorganic particles (SiO$_2$)/content | | | Species of aluminum-oxygen compound/content | Nanocolloidal silica | Species of coagulation controlling agent/content | 28-day strength (psi) |
|---|---|---|---|---|---|---|---|---|
| 21 | Quartz sand 49.1% | 1.6 μm 18.1% | | 50 μm 9.7% | Al$_2$O$_3$ 8.8% | 12.1% | Citric acid 2.2% | 2063 |
| 22 | Quartz sand 49.1% | 1.6 μm 18.1% | | 50 μm 9.7% | Al(OH)$_3$ 8.8% | 12.1% | Citric acid 2.2% | 2543 |
| 35 | Quartz sand 53.6% | 1.6 μm 8.1% | 10 μm 12.0% | 50 μm 6.3% | High-alumina cement 6.1% | 12.2% | Citric acid 1.8% | 4530 |

The nanocolloidal silica was prepared by mixing nanocolloidal silica with 18 nm and nanocolloidal silica with 80 nm at a ratio of about 8:2 (solid content: 40 wt. %).

Example 3

A non-calcined concrete composition having components as listed in the table below was prepared. The inorganic particles (aggregate) and the micron inorganic particles (SiO$_2$) were mixed according to the weight ratio shown in Table 3, and then mixed uniformly with the coagulation aid and the aluminum-oxygen compound. Subsequently, the nanocolloidal silica and the coagulation controlling agent were added and the components were blended, and the compressive strength was measured after curing for 14 or 28 days.

TABLE 3

| No. | Aggregate/content | Particle size of micron inorganic particles (SiO$_2$)/content | Species of coagulation aid/content | Species of aluminum-oxygen compound/content | Nanocolloidal silica | Species of coagulation controlling agent/content | 28-day strength (psi) |
|---|---|---|---|---|---|---|---|
| 7 | Quartz sand 49.7% | 50 μm/28.1% | MgO 2.2% | High-alumina cement 5.6% | 12.2% | Citric acid 2.2% | 5328 |
| 8 | Quartz sand 49.7% | 10 μm/28.1% | MgO MgO 2.2% | High-alumina cement 5.6% | 12.2% | Citric acid 2.2% | 6170 |
| 9 | Quartz sand 49.7% | 1.6 μm/28.1% | MgO MgO 2.2% | High-alumina cement 5.6% | 12.2% | Citric acid 2.2% | 4140* |
| 14 | Quartz sand 48.0% | 50 μm/27.2% | MgOMgO 2.2% | Al$_2$O$_3$ 8.6% | 11.8% | Citric acid 2.2% | 3520 |
| 15 | Quartz sand 48.0% | 10 μm/27.2% | MgOMgO 2.2% | Al$_2$O$_3$ 8.6% | 11.8% | Citric acid 2.2% | 3105 |
| 16 | Quartz sand 48.0% | 1.6 μm/27.2% | MgOMgO 2.2% | Al$_2$O$_3$ 8.6% | 11.8% | Citric acid 2.2% | 3866 |
| 17 | Quartz sand 48.0% | 50 μm/27.2% | MgOMgO 2.2% | Al(OH)$_3$ 8.6% | 11.8% | Citric acid 2.2% | 4423 |
| 18 | Quartz sand 48.0% | 10 μm/27.2% | MgOMgO 2.2% | Al(OH)$_3$ 8.6% | 11.8% | Citric acid 2.2% | 4322 |
| 19 | Quartz sand 48.0% | 1.6 μm/27.2% | MgO MgO 2.2% | Al(OH)$_3$ 8.6% | 11.8% | Citric acid 2.2% | 4150 |
| 27 | Quartz sand 49.7% | 10 μm/28.1% | MgOMgO 2.2% | High-alumina cement 5.6% | 12.2% | tartaric acid 2.2% | 5945 |

The nanocolloidal silica was prepared by mixing nanocolloidal silica with 18 nm and nanocolloidal silica with 80 nm at a ratio of about 8:2 (solid content: 40 wt. %).
*The strength of No. 9 is 14-day strength.

Example 4

A non-calcined cementitious composition having components as listed in the table below was prepared. The micron inorganic particles (SiO$_2$) as graded powders were formed by mixing in accordance with the particle sizes and percents by weight shown in Table 4. The inorganic particles (aggregate) were mixed with the graded powder, and then with the coagulation aid and the aluminum-oxygen compound uniformly. Subsequently, the nanocolloidal silica and the coagulation controlling agent were added and the components were blended, and the compressive strength was measured after curing for 28 days.

TABLE 4

| No. | Aggregate/content | Micron inorganic particles SiO₂ (1.6 μm) | SiO₂ (10 μm) | SiO₂ (50 μm) | Coagulation aid/content | Aluminum-oxygen compound/content | Particle size of nanocolloidal silica/(Solid content)/content | Coagulation controlling agent | 28-day strength |
|---|---|---|---|---|---|---|---|---|---|
| 10 | Quartz sand 49.7% | — | 18.3% | 9.8% | MgO 2.2% | High-alumina cement 5.6% | 12.2% | Citric acid 2.2% | 6360 |
| 11 | Quartz sand 49.7% | 18.3% | — | 9.8% | MgO 2.2% | High-alumina cement 5.6% | 12.2% | Citric acid 2.2% | 6716 |
| 12 | Quartz sand 49.7% | 18.3% | 9.8% | — | MgO 2.2% | High-alumina cement 5.6% | 12.2% | Citric acid 2.2% | 6822 |
| 13 | Quartz sand 49.7% | 11.1% | 11.1% | 5.9% | MgO 2.2% | High-alumina cement 5.6% | 12.2% | Citric acid 2.2% | 8240 |
| 28 | Quartz sand 49.7% | 11.1% | 11.1% | 5.9% | MgO 2.2% | High-alumina cement 5.6% | 7 nm (20%) 12.2% | Citric acid 2.2% | 4603 |
| 29 | Quartz sand 49.7% | 11.1% | 11.1% | 5.9% | MgO 2.2% | High-alumina cement 5.6% | 18 nm (40%) 12.2% | Citric acid 2.2% | 5698 |
| 30 | Quartz sand 49.7% | 11.1% | 11.1% | 5.9% | MgO 2.2% | High-alumina cement 5.6% | 11 nm (30%) 12.2% | Citric acid 2.2% | 5374 |
| 31 | Quartz sand 49.7% | 11.1% | 11.1% | 5.9% | MgCO₃ 2.1% | High-alumina cement 5.6% | 11.9% | Citric acid 2.6% | 4500 |
| 32 | Quartz sand 49.7% | 11.1% | 11.1% | 5.9% | CaCO₃ 2.2% | High-alumina cement 5.6% | 12.2% | Citric acid 2.2% | 5000 |

Except for Nos. 28 to 30, the nanocolloidal silica was prepared by mixing nanocolloidal silica with 18 nm and nanocolloidal silica with 80 nm at a ratio of about 8:2 (solid content: 40 wt. %).

Example 5

A non-calcined cementitious composition having components as listed in the table below was prepared. The micron inorganic particles (SiO₂) as graded powders were formed by mixing in accordance with the particle sizes and percents by weight shown in Table 5. The inorganic particles (aggregate) were mixed with the graded powder, and then with the coagulation aid and the aluminum-oxygen compound uniformly. Subsequently, the nanocolloidal silica and the coagulation controlling agent were added and the components were blended, and the compressive strength was measured after curing for 7 or 28 days.

TABLE 5

| No. | Aggregate/content | Micron inorganic particles SiO₂ (1.6 μm) | SiO₂ (10 μm) | SiO₂ (50 μm) | Coagulation aid/content | Aluminum-oxygen compound/content | Nanocolloidal silica/content | Coagulation controlling agent/content | 28-day strength (psi) |
|---|---|---|---|---|---|---|---|---|---|
| 20 | Quartz sand 49.0% | 11.0% | 11.0% | 5.8% | MgO 2.2% | High-alumina cement/Al(OH)₃ 5.5%/1.4% | 12.1% | Citric acid 2.2% | 11343 * |
| 23 | Quartz sand 47.9% | 10.7% | 10.7% | 5.7% | MgO 2.1% | High-alumina cement/Al(OH)₃ 5.4%/3.6% | 11.8% | Citric acid 2.1% | 12739 * |
| 24 | Quartz sand 48.3% | 10.8% | 10.8% | 5.7% | MgO 2.2% | High-alumina cement/Al(OH)₃ 5.4%/2.7% | 11.9% | Citric acid 2.2% | 12936 * |
| 25 | Quartz sand 47.5% | 10.6% | 10.6% | 5.6% | MgO 2.1% | High-alumina cement/Al(OH)₃ 5.3%/4.4% | 11.7% | Citric acid 2.1% | 14613 * |
| 26 | Quartz sand 49.0% | 11.0% | 11.0% | 5.8% | MgO 2.2% | High-alumina cement/Al(OH)₃ 5.5%/2.2% | 12.1% | Citric acid 2.2% | 5160 ** |
| 36 | Quartz sand 49.0% | 11.0% | 11.0% | 5.8% | MgO 2.2% | Al₂O₃/Al(OH)₃ 5.5%/2.2% | 12.1% | Citric acid 2.2% | 3530 |

The nanocolloidal silica was prepared by mixing nanocolloidal silica with 18 nm and nanocolloidal silica with 80 nm at a ratio of about 8:2 (solid content: 40 wt. %).
* The strength of Nos. 20 and 23 to 25 is 2-day strength at 180° C.
** The strength of No. 26 is 7-day strength.

Example 6

A non-calcined cementitious composition having components as listed in the table below was prepared. The micron inorganic particles (SiO$_2$) as graded powders were formed by mixing in accordance with the particle sizes and percents by weight shown in Table 6. The inorganic particles (aggregate) were mixed with the graded powder, and then with the coagulation aid and the aluminum-oxygen compound uniformly. Subsequently, the nanocolloidal silica and the coagulation controlling agent (citric acid) were added and the components were blended, and the compressive strength was measured after curing for 10 or 28 days.

TABLE 6

| | | Micron inorganic particles | | | | Aluminum-oxygen | | | | |
|---|---|---|---|---|---|---|---|---|---|---|
| No. | Aggregate/ content | SiO$_2$ (1.6 μm) | SiO$_2$ (10 μm) | SiO$_2$ (45 μm) | Coagulation aid/content | compound/ content | Nanocolloidal silica/content | Coagulation controlling agent/content | Active silica/ content | 28-day strength (psi) |
| 410 | Quartz sand 53.0% | 8.0% | 11.7% | 6.2% | MgO 2.1% | High-alumina cement 5.9% | 11.9% | Citric acid 1.8% | 15 μm/ 0.3% | 6460 (ponding) 8317 8906.8 |
| 412 | Quartz sand 52.2% | 7.9% | 11.6% | 6.2% | MgO 2.3% | High-alumina cement 5.8% | 11.8% | Citric acid 1.9% | 15 μm/0.5% | 9696.8 (ponding) 12570.3 9519.5 |
| 413 | Quartz sand 52.3% | 7.9% | 11.7% | 6.2% | MgO 2.0% | High-alumina cement 5.8% | 11.8% | Citric acid 1.8% | 15 μm/0.5% | 8444.5 |
| 414 | Quartz sand 51.9% | 7.8% | 11.6% | 6.1% | MgO 2.3% | High-alumina cement 5.8% | 11.7% | Citric acid 1.8% | 15 μm/1.0% | 7756* |
| 415 | Quartz sand 51.4% | 7.8% | 11.5% | 6.1% | MgO 2.3% | High-alumina cement 5.7% | 11.7% | Citric acid 1.8% | 15 μm/2.0% | 5631* |
| 416 | Quartz sand 52.8% | 8.0% | 11.8% | 6.2% | MgO 1.8% | High-alumina cement 5.9% | 11.9% | Citric acid 1.3% | 5~8 μm/0.5% | 8583.5 |
| 4001 | silicon carbide 0.7 mm 54.9% | silicon carbide 18 μm 27.0% | | | MgO 1.5% | High-alumina cement 4.9% | 10.0% | Citric acid 1.1% | 15 μm/0.4% | 9016 |

The nanocolloidal silica was prepared by mixing nanocolloidal silica with 18 nm and nanocolloidal silica with 80 nm at a ratio of about 8:2 (solid content: 40 wt. %).
*The strength of Nos. 414 and 415 is 10-day strength.

Example 7

A non-calcined cementitious composition having components as listed in the table below was prepared. River sand was firstly ground, graded, and used as micron inorganic particles, with which graded powders were formed by mixing in accordance with the particle sizes and percents by weight shown in Table 7. The inorganic particles (aggregate) were mixed with the graded powder, and then with the coagulation aid and the aluminum-oxygen compound (high-alumina cement) uniformly. Subsequently, the nanocolloidal silica and the coagulation controlling agent (citric acid) were added and the components were blended, and the compressive strength was measured after curing for 28 days.

TABLE 7

| | | Micron inorganic particles | | | | Aluminum-oxygen | | | | |
|---|---|---|---|---|---|---|---|---|---|---|
| No. | Aggregate/ content | River sand (1.6 μm) | River sand (10 μm) | River sand (50 μm) | Coagulation aid/content | compound/ content | Nanocolloidal silica | Coagulation controlling agent/content | Active silica/ content | 28-day strength (psi) |
| 501 | Quartz sand 49.7% | 11.1% | 11.1% | 5.9% | MgO 2.2% | High-alumina cement 5.6% | 12.2% | Citric acid 2.2% | — | 6700 |

TABLE 7-continued

| No. | Aggregate/ content | Micron inorganic particles | | | Coagulation aid/content | Aluminum-oxygen compound/ content | Nanocolloidal silica | Coagulation controlling agent/content | Active silica/ content | 28-day strength (psi) |
| --- | --- | --- | --- | --- | --- | --- | --- | --- | --- | --- |
| | | River sand (1.6 μm) | River sand (10 μm) | River sand (50 μm) | | | | | | |
| 502 | Quartz sand 49.7% | 19.4% | — | 8.7% | MgO 2.2% | High-alumina cement 5.6% | 12.2% | Citric acid 2.2% | — | 5200 |
| 503 | Quartz sand 49.7% | 19.4% | 8.7% | — | MgO 2.2% | High-alumina cement 5.6% | 12.2% | Citric acid 2.2% | — | 4800 |
| 504 | Quartz sand 49.5% | 11.1% | 11.1% | 5.9% | MgO 2.2% | High-alumina cement 5.5% | 12.2% | Citric acid 2.2% | 15 μm/0.4% | 6000 |
| 505 | Quartz sand 49.5% | 19.4% | 8.6% | — | MgO 2.2% | High-alumina cement 5.5% | 12.2% | Citric acid 2.2% | 15 μm/0.4% | 4450 |
| 506 | Quartz sand 49.5% | 19.4% | — | 8.6% | MgO 2.2% | High-alumina cement 5.5% | 12.2% | Citric acid 2.2% | 15 μm/0.4% | 4600 |

The nanocolloidal silica was prepared by mixing nanocolloidal silica with 18 nm and nanocolloidal silica with 80 nm at a ratio of about 8:2 (solid content: 40 wt. %).

It can be known from the test result that the readily available sand is also useful in the present invention.

Example 8

A non-calcium cementitious composition was prepared with 52.8 wt % of Quartz sand, 8.0 wt. % of 1.6 μm $SiO_2$, 11.8 wt. % of 10 μm $SiO_2$, 6.2 wt. % of 45 μm $SiO_2$, 5.9 wt. % of high-alumina cement, 1.8 wt. % of magnesium oxide, 1.3 wt. % of citric acid, and the nanocolloidal silica having different particle sizes in combination shown in Table 8. The micron inorganic particles ($SiO_2$) as graded powders were formed by mixing. Then, the inorganic particles (aggregate) were mixed with the graded powders, and then with the coagulation aid (magnesium oxide) and the aluminum-oxygen compound (high-alumina cement) uniformly. Subsequently, the nanocolloidal silica (a single component or a combination of more than one component) and the coagulation controlling agent (citric acid) were added and the components were blended, and the compressive strength was measured after curing for 28 days.

TABLE 8

| | Raw material | | | |
| --- | --- | --- | --- | --- |
| No. | Nanocolloidal silica (80 nm) | Nanocolloidal silica (15 nm) | Nanocolloidal silica (10 nm) | 28-day strength (psi) |
| 511 | 0.3% | 6.0% | 8.4% | 11000 |
| 512 | 9.6% | 2.4% | — | 8135 |
| 513 | 7.2% | 4.8% | — | 10648 |
| 514 | 4.8% | 7.2% | — | 12557 |
| 515 | 2.4% | 9.6% | — | 9660 |
| 516 | — | 12.0% | — | 9908 |
| 517 | — | — | 12.0% | 8674 |
| 518 | 9.6% | — | 2.4% | 9356 |
| 519 | 7.2% | — | 4.8% | 9589 |

Example 9

A concrete composition having components as listed in the table below was prepared. The aggregate and the micron inorganic particles ($SiO_2$) were mixed according to the percents by weight shown in Table 9, and then mixed with the coagulation aid. Subsequently, the nanocolloidal silica and the coagulation controlling agent (citric acid) were added and the components were blended, and the compressive strength was measured after curing for 28 days.

TABLE 9

| No. | Aggregate/ content | Micron inorganic particles $SiO_2$ (45 μm) | Coagulation aid/content | Aluminum-oxygen compound/content | Particle size of nanocolloidal silica (Solid content)/content | Coagulation controlling agent/content | 28-day strength (psi) |
| --- | --- | --- | --- | --- | --- | --- | --- |
| C1 | Quartz sand 56.3% | 27.7% | MgO 2.2% | No | 7 nm (20%) 12.7% | Citric acid 1.1% | <2000 |

Example 10

A concrete composition having components as shown in Table 10 below was prepared.

TABLE 10

| | Raw material | | | | | | |
|---|---|---|---|---|---|---|---|
| | | Micron inorganic particles | | | | Aluminum-oxygen | Nanocolloidal silica (Solid | Coagulation controlling |
| No. | Aggregate/ content | $SiO_2$ (1.6 μm) | $SiO_2$ (10 μm) | $SiO_2$ (45 μm) | Coagulation aid/content | compound/ content | content)/ content | agent/ content |
| C2 | Quartz sand 60.3% | 8.0% | 11.8% | 6.2% | MgO 1.8% | — | 18/80 nm (40%) 9.5%/2.4% | — |

The composition sets into a block in a very short time, which is adverse to the application.

Example 11

A concrete was prepared with a non-calcined cementitious composition and a crude aggregate shown in Table 11 below.

TABLE 11

| | | Raw material | | | | | | | |
|---|---|---|---|---|---|---|---|---|---|
| | | Micron inorganic particles | | | | | Nanocolloidal | Coagulation | Active |
| No. | Crude aggregate | $SiO_2$ 1.6 μm | $SiO_2$ 10 μm | $SiO_2$ 45 μm | Coagulation aid/content | Aluminum-oxygen compound/content | silica (Solid content)/content | controlling agent/content | silica/ content |
| 601 | Gravel 52.3% | 7.9% | 11.7% | 6.2% | MgO 2.3% | High-alumina cement 5.9% | 18/80 nm (40%) 9.5%/2.4% | Citric acid 1.3% | 15 μm/0.5% |

The components were mixed and poured into a mold to prepare multiple concrete specimens, which were stood for 28 days and then tested for compressive strength of cylindrical concrete specimens according to CNS1232 (ASTM C39). The compressive strength is shown in Table 12 below.

TABLE 12

| No. | Compressive strength (psi) | Average (psi) |
|---|---|---|
| C01 | 6927 | |
| C02 | 6002 | |
| C03 | 6642 | |

Example 12

The flexural strength of the concrete specimens prepared in Example 11 was measured in a flexural strength test of cylindrical concrete specimens according to CNS1238 (ASTM C348). The flexural strength is shown in Table 13 below.

TABLE 13

| No. | Flexural strength (psi) | Average (psi) |
|---|---|---|
| B01 | 688.4 | |
| B02 | 574.6 | |

Example 13

The splitting tensile strength of the concrete specimens prepared in Example 11 was measured in a splitting tensile strength test of cylindrical concrete specimens according to CNS3801 (ASTM C496). The splitting tensile strength is shown in Table 14 below.

TABLE 14

| No. | Splitting tensile strength (psi) | Average (psi) |
|---|---|---|
| T01 | 533.3 | |
| T02 | 486.4 | |
| T03 | 381.2 | |

It can be known from Examples 11 to 13 that the concrete prepared with the non-calcined cementitious composition or the non-calcined concrete composition of the present invention exhibits good physical and mechanical properties.

Example 14

The linear shrinkage of the concrete specimen (S01) prepared in Example 11 and the concrete specimen (R01) prepared with the commercial Portland cement and an aggregate was measured according to the CNS 14603 (ASTM C157) Standard. The linear shrinkage (μ) is shown in Table 15 below.

TABLE 15

| No. | Day 1 | Day 3 | Day 5 | Day 7 | Day 28 |
|---|---|---|---|---|---|
| R01 | 147 | 252 | 312 | 399 | 503 |
| S01 | 52 | 120 | 132 | 176 | 176 |

It can be known from the test result that the concrete prepared with the non-calcined cementitious composition or the non-calcined concrete composition of the present invention is far better than the concrete prepared with the traditional Portland cement in terms of linear shrinkage.

The above-described embodiments of the present invention are intended to be illustrative only. Numerous alternative embodiments may be devised by persons skilled in the art without departing from the scope of the following claims.

What is claimed is:

1. A composition, comprising:
   (a) micron inorganic particles having a particle size ranging from 1.0 to 100 μm of about 31% to 87% based on the total weight of the composition, wherein the micron inorganic particles are inorganic particles containing silicon;
   (b) an aluminum-oxygen compound;
   (c) nanocolloidal silica,
   (d) a coagulation controlling agent, and
   at least one of a coagulation aid, active silica, and a water-reducing agent.

2. The composition according to claim 1, wherein the particle size distribution of the micron inorganic particles is at least bimodal.

3. The composition according to claim 1, wherein the micron inorganic particles have a trimodal particle size distribution, wherein the particles having a particle size or size range at a peak account for, independently from each other, at least 20% to 50% of the total weight of the micron inorganic particles.

4. The composition according to claim 1, wherein the nanocolloidal silica has a bimodal particle size distribution, wherein the particles having a particle size or size range at a peak account for, independently from each other, at least 30% to 70% of the total weight of the nanocolloidal silica.

5. A concrete comprising the composition according to claim 1.

6. The concrete according to claim 5, having at least one of the following characteristics: a 28-day compressive strength of at least 1,800 psi as measured in accordance with CNS 1010 (ASTM C109) Standard or CNS 1232 (ASTM C39) Standard, a 28-day flexural strength of at least 200 psi as measured in accordance with CNS 1238 (ASTM C348) Standard, a 28-day splitting tensile strength of at least 200 psi as measured in accordance with CNS 3801 (ASTM C496) Standard, and a 28-day linear shrinkage of at most 1500μ as measured in accordance with CNS 14603 (ASTM C157) Standard.

7. A composition, comprising
   (a) inorganic particles of about 66% to 92% based on the total weight of the composition;
   (b) an aluminum-oxygen compound;
   (c) nanocolloidal silica,
   (d) a coagulation controlling agent, and
   at least one of a coagulation aid, active silica, and a water-reducing agent,
   wherein the inorganic particles comprise micron inorganic particles having a particle size ranging from 1.0 to 100 μm, and wherein the micron inorganic particles are inorganic particles containing silicon and account for 25% to 45% of the total weight of the inorganic particles.

8. The composition according to claim 7, wherein the particle size distribution of the micron inorganic particles is at least bimodal.

9. The composition according to claim 7, wherein the micron inorganic particles have a trimodal particle size distribution, wherein the particles having a particle size or size range at the peak account for, independently from each other, at least 20% to 50% of the total weight of the micron inorganic particles.

10. The composition according to claim 7, wherein the nanocolloidal silica has a bimodal particle size distribution, wherein the particles having a particle size or size range at the peak account for, independently from each other, at least 30% to 70% of the total weight of the nanocolloidal silica.

11. A concrete comprising a composition according to claim 7.

12. The concrete according to claim 11, having at least one of the following characteristics: a 28-day compressive strength of at least 1,800 psi as measured in accordance with CNS 1010 (ASTM C109) Standard or CNS 1232 (ASTM C39) Standard, a 28-day flexural strength of at least 200 psi as measured in accordance with CNS 1238 (ASTM C348) Standard, a 28-day splitting tensile strength of at least 200 psi as measured in accordance with CNS 3801 (ASTM 0496) Standard, and a 28-day linear shrinkage of at most 1500μ as measured in accordance with CNS 14603 (ASTM C157) Standard.

* * * * *